Dec. 30, 1924.
P. C. STICKNEY
EMERGENCY RIM
Filed Nov. 23, 1923
1,520,777
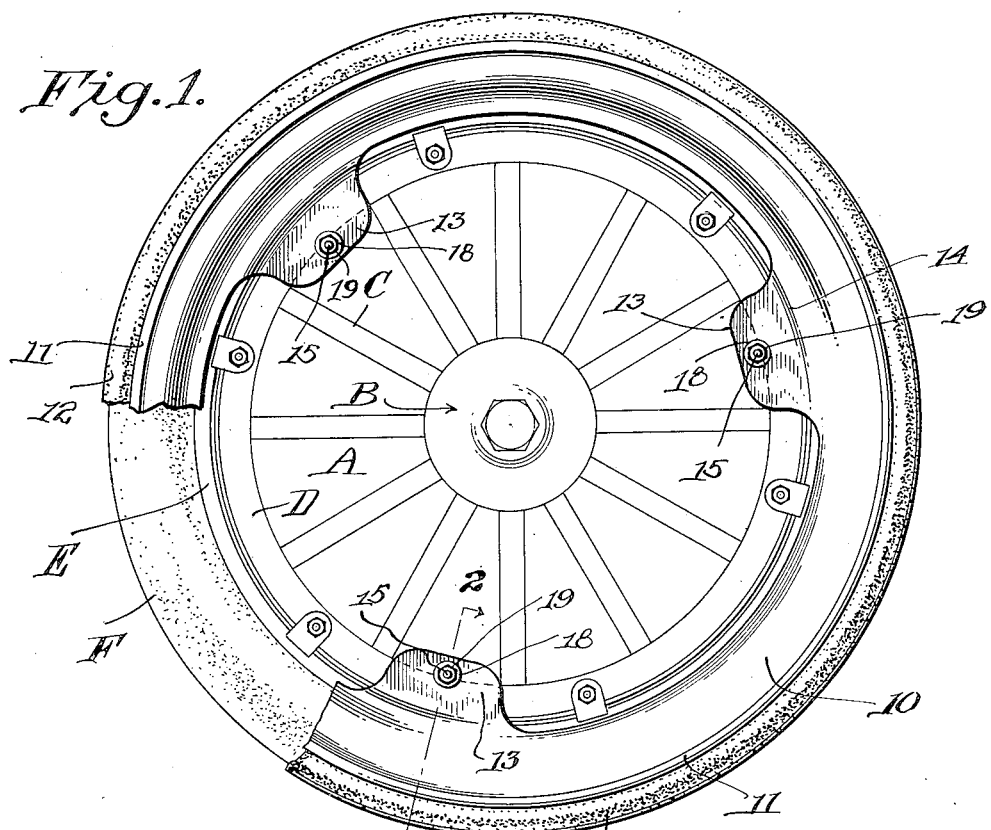
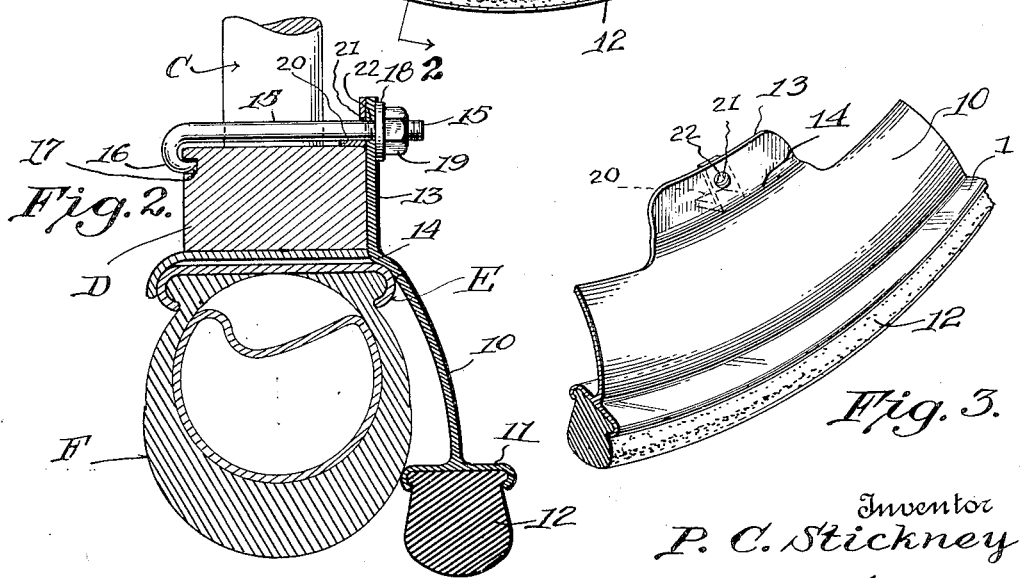
Inventor
P. C. Stickney
Malcolm McClellan
Attorney Patented Dec. 30, 1924.

1,520,777

UNITED STATES PATENT OFFICE.

PERCY C. STICKNEY, OF JACKSONVILLE, FLORIDA.

EMERGENCY RIM.

Application filed November 23, 1923. Serial No. 676,626.

*To all whom it may concern:*

Be it known that I, PERCY C. STICKNEY, a citizen of the United States, residing at Jacksonville, in the county of Duval and State of Florida, have invented certain new and useful Improvements in Emergency Rims, of which the following is a specification.

This invention relates to vehicle wheels and has for its object the provision of a cushion tired emergency rim structure designed to be detachably engaged upon an automobile wheel in case of deflation of the pneumatic tire thereon, the emergency wheel being for the purpose of bearing the weight of the vehicle and preventing injury to the deflated pneumatic tire.

Another object is the provision of an emergency rim and tire of this character which is easily carried in the car and which may be readily engaged upon any wheel having a punctured tire without it being necessary to employ any special tools or to make any preparatory changes in the wheel itself, the device having the further advantage of making it unnecessary to carry spare tires or tubes and obviating the troublesome work of changing tires on the road.

A further object is the provision of an attachment of this character which will lie flat against the side of the felly of the wheel and engage the inner edge of the rim so as to be effectively braced, additional bracing and supporting means being provided for engagement with the inner periphery of the felly.

An additional object is the provision of a device of this character which will be very simple and inexpensive to manufacture, efficient in use, durable in service, and a general improvement in the art.

With the above and other objects and advantages in view, the invention consists in the combination and arrangement of parts to be hereinafter more fully described and claimed and illustrated in the accompanying drawings in which—

Figure 1 is a side elevation of an automobile wheel equipped with my device, a portion thereof being broken away.

Figure 2 is a cross section on the line 2—2 of Figure 1.

Figure 3 is a fragmentary perspective view of the attachment.

Referring more particularly to the drawings, the letter A represents an automobile wheel including the usual hub B, spokes C, felly D and rim E carrying a pneumatic tire F. In carrying out my invention I provide a ring-like body 10 formed of any suitable material but in actual practice preferably constructed as a heavy sheet-steel stamping. This ring-like member is concavo-convex in cross section and terminates or merges at its outer periphery into a rim 11 which may be formed integral therewith. This rim is of such construction as to carry an ordinary cushion tire 12 which has a diameter preferably slightly larger than the tire of the wheel in connection with which it is designed for use so that when the attachment is in place the deflated tire of the wheel will be held entirely out of engagement with the surface traveled over. The cross-sectional curvature of the ring member acts to stiffen it to a certain extent and is necessary so as to bring the cushion tire to one side of the pneumatic tire.

Formed on the inner periphery of the ring member at spaced points, are three or more ears 13 which are adapted to lie flat against the side of the wheel felly D and the junctures of the ears with the ring member are formed with a somewhat abrupt curvature to define shoulders 14 which bear against the inner periphery and edge of the rim E, as clearly shown in Figure 2. The engagement of these shoulders at the points indicated serves to hold the ring member against radial displacement with respect to the wheel.

As an additional brace, I provide angular brackets 20 which are suitably secured to the ears 13 and which are formed with holes 21 registering with holes 22 in the ears. These brackets engage against the inner periphery of the felly.

To effect securing of the attachment, I provide a plurality of bolts 15 which are threaded at one end and which have their other ends formed with hooks 16. These bolts pass through the registering holes 21 and 22 and are disposed inwardly of the wheel felly in transverse relation thereto. The hooks 16 are engaged within recesses 17 in the face of the felly most remote from the ring member while their other ends carry washers 18 and nuts 19. The recesses 17 need not be initially formed in a wooden felly as the mere drawing up of the nuts will cause the hooks to bite into the felly, though in case of a metal wheel the recesses must be provided.

In the use of the device it is intended that in case the tire F should become deflated the wheel should be jacked up or lifted by any means, after which my emergency rim is placed against the wheel A with the ears 13 bearing flat against the felly D and the angle brackets 20 engaging the inner periphery. The bolts 15 are placed in position, the washers 18 applied, and the nuts 19 drawn up to hold the attachment in place. When this is done the vehicle may be lowered and the weight will come upon the cushion tire 12 while the pneumatic tire will be held entirely out of contact with the surface traveled over so that it cannot become rim cut or otherwise injured.

From the foregoing description and a study of the drawings it will be apparent that I have thus provided a simply constructed, inexpensive and easily applied emergency rim and tire which will be very convenient in use and which may be placed in position in an extremely short time and with very little effort. The device is bound to be a great saver of tires in case of puncturing thereof so that it should recommend itself to the motoring public.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention, what I claim as new and desire to secure by Letters-Patent, is:

1. An emergency rim for use upon a vehicle wheel in case of deflation of a pneumatic tire thereon, comprising a ring-like body, a rim thereon carrying a cushion tire, a plurality of ears on the inner periphery of said body adapted to lie against the felly of the vehicle wheel, and means engaging the felly for holding said ears in position, said means comprising bolts extending through said ears and disposable transversely of the inner periphery of the felly, said bolts terminating in hooks seating within recesses in the felly.

2. An emergency rim of the character described comprising a ring-like body formed with a cushion tire carrying rim, ears on said body lying flat against the felly of a vehicle wheel, bolts extending through said ears transversely of the wheel felly and terminating at one end in hooks engaging within recesses in the felly, and nuts on said bolts.

3. An emergency rim of the character described comprising a ring-like body adapted for disposition against the side of a vehicle wheel, a plurality of ears formed integrally upon the inner periphery of said body and adapted to lie flat against the wheel felly, and hook bolts passing through said ears and engaging with the opposite side of the felly.

4. An emergency rim of the character described comprising a ring-like body adapted for disposition against the side of a vehicle wheel, a plurality of ears formed integrally upon the inner periphery of said body and adapted to lie flat against the wheel felly, and hook bolts passing through said ears and engaging with the opposite side of the felly, the junctures of the ears with the body being formed with an abrupt curvature defining shoulders bearing against the inner periphery of the wheel rim.

5. An emergency rim comprising a ring-like body disposable against the side of a vehicle wheel and carrying a tire of a diameter no less than that of the tire on the wheel, ears on the inner edge of the body engageable with the side of the wheel felly, angular brackets on said ears engageable with the inner periphery of the felly, and securing members passing through the ears and brackets and engaging the felly.

6. An emergency rim comprising a ring-like body disposable against the side of a vehicle wheel and carrying a tire of a diameter no less than that of the tire on the wheel, ears on the inner edge of the body engageable with the side of the wheel felly, angular brackets on said ears engageable with the inner periphery of the felly, and hooked bolts passing through the ears and brackets and engaging the felly at the opposite side thereof.

In testimony whereof I affix my signature.

PERCY C. STICKNEY.